United States Patent
Petri et al.

(10) Patent No.: US 11,658,944 B2
(45) Date of Patent: May 23, 2023

(54) METHODS AND APPARATUS FOR ENCRYPTED COMMUNICATION

(71) Applicant: Arm IP Limited, Cambridge (GB)

(72) Inventors: Gustavo Federico Petri, Cambridge (GB); Guilhem Floréal Bryant, Cambridge (GB); Dominic Phillip Mulligan, St Neots (GB); Brendan James Moran, Histon (GB)

(73) Assignee: ARM IP LIMITED, Cambridge (GB)

( * ) Notice: Subject to any disclaimer, the term of this patent is extended or adjusted under 35 U.S.C. 154(b) by 407 days.

(21) Appl. No.: 16/817,852

(22) Filed: Mar. 13, 2020

(65) Prior Publication Data

US 2021/0288944 A1   Sep. 16, 2021

(51) Int. Cl.
*H04L 9/08* (2006.01)
*H04L 9/40* (2022.01)
*H04L 67/14* (2022.01)

(52) U.S. Cl.
CPC ........ *H04L 63/0428* (2013.01); *H04L 9/0841* (2013.01); *H04L 63/061* (2013.01); *H04L 63/166* (2013.01); *H04L 67/14* (2013.01)

(58) Field of Classification Search
CPC ... H04L 67/14; H04L 63/0428; H04L 63/126; H04L 63/0245; H04L 63/166; H04L 63/061; H04L 63/065; H04L 63/123; H04L 63/045; H04L 9/0838; H04L 9/0897; H04L 9/0841; H04L 9/0825; H04L 2209/76

(Continued)

(56) References Cited

U.S. PATENT DOCUMENTS 8,356,177 B2 * 1/2013 McGrew .............. H04L 9/3242
                                                        713/168
9,038,163 B2 * 5/2015 Larson ............... H04L 63/1458
                                                        726/15

(Continued)

OTHER PUBLICATIONS

Han et al., "SGXBox: Enabling Visibility on Encrypted Traffic using a Secure Middlebox Module", APNet 17, Aug. 3-4, 2017, 7 pages.

(Continued)

*Primary Examiner* — Amare F Tabor
(74) *Attorney, Agent, or Firm* — Nixon & Vanderhye, PC

(57) ABSTRACT

Aspects of the present disclosure relate to an apparatus comprising first interface circuitry to communicate with a first computing device and second interface circuitry to communicate with a second computing device. The first interface circuitry is configured to receive a handshake message from the first computing device. The second interface circuitry is configured to transmit the handshake message to the second computing device and to receive a handshake response message from the second computing device. The first interface circuitry is configured to transmit the handshake response message to the first computing device, whereby to establish a communication session between the first computing device and the second computing device. Apparatus comprises trusted execution environment circuitry to determine a cryptographic session key associated with said communication session, and use said session key to decrypt content of messages transmitted between the first and second computing devices via the apparatus, and analyse said decrypted content.

17 Claims, 7 Drawing Sheets

(58) Field of Classification Search
USPC .......................................................... 713/168
See application file for complete search history.

(56) References Cited

U.S. PATENT DOCUMENTS

| | | | | |
|---|---|---|---|---|
| 9,489,519 | B2* | 11/2016 | Feroz | G06F 21/568 |
| 10,389,524 | B2* | 8/2019 | Karagiannis | H04L 9/083 |
| 10,447,658 | B2* | 10/2019 | Shah | H04L 63/0272 |
| 10,742,611 | B2* | 8/2020 | Naylor | H04L 9/0822 |
| 11,245,685 | B2* | 2/2022 | Konda | H04L 9/0825 |
| 2019/0140823 | A1* | 5/2019 | Xie | H04L 63/166 |

OTHER PUBLICATIONS

Goltzsche et al., "EndBox: Scalable Middlebox Functions Using Client-Side Trusted Execution", DSN '18, Jun. 25-28, 2018, 12 pages.

Trach et al., ShieldBox: Secure Middleboxes using Shielded Execution, SOSR' 18, Mar. 28-29, 2018, 14 pages.

Duan et al., "LightBox: Full-stack Protected Stateful Middlebox at Lightning Speed", CCS '19, Nov. 11-15, 2019, 17 pages.

Naylor et al., "And Then There Were More: Secure Communication for More Than Two Parties", CoNext '17, 2017, 13 pages.

\* cited by examiner

US 11,658,944 B2

METHODS AND APPARATUS FOR ENCRYPTED COMMUNICATION

BACKGROUND

The present technique relates to the field of privacy in computer communications, in particular communication between two endpoint devices via a middlebox device. Examples of middlebox devices include proxies, firewalls, intrusion detection systems, routers, and the like. In such systems, it may be desirable for communications between the endpoint devices to be encrypted. For example, end-to-end encryption may be applied such that only the endpoint devices can read the communicated messages and devices on the communication path between the endpoint devices, including one or more middleboxes, cannot read the messages. Examples of protocols for end-to-end encryption include Transport Layer Security (TLS) and Secure Sockets Layer (SSL).

In some systems, it may be desirable for a middlebox to read the content of messages transmitted between the endpoints. For example, such a middlebox could determine, based on the content of the messages, whether or not to forward a message from one endpoint to the other endpoint. This filtering can for example be performed in order to detect intrusions into the system, prevent distributed denial of service (DDoS) attacks, enforce quality of service, partition VLAN domains, and/or perform firewall and access control functions.

The two desirable functionalities outlined above conflict with each other. In particular, the aforementioned analysis of message content cannot typically be performed for an encrypted communication channel because, as explained above, a middlebox in such a system cannot typically read encrypted messages between endpoint devices.

It is therefore desirable to provide a system in which analysis of message content at a middlebox can be performed for an encrypted communication channel, without compromising privacy of communication between the endpoints.

SUMMARY

At least some examples provide an apparatus comprising:
first interface circuitry to communicate with a first computing device;
second interface circuitry to communicate with a second computing device, wherein:
the first interface circuitry is configured to receive a handshake message from the first computing device;
the second interface circuitry is configured to transmit the handshake message to the second computing device and to receive a handshake response message from the second computing device; and
the first interface circuitry is configured to transmit the handshake response message to the first computing device, whereby to establish a communication session between the first computing device and the second computing device, and trusted execution environment circuitry to execute computer instructions to:
determine a cryptographic session key associated with said communication session; and
use said session key to decrypt content of encrypted messages transmitted between the first computing device and the second computing device via the apparatus, and to analyse said decrypted content.

Further examples provide a method comprising:
transmitting a handshake message from a first computing device to a middlebox device;
transmitting the handshake message from the middlebox device to a second computing device;
responsive to receiving the handshake message at the second computing device, transmitting a handshake response message from the second computing device to the first computing device, via the middlebox device, whereby to establish a communication session between the first computing device and the second computing device;
determining, by trusted execution environment circuitry of the middlebox device, a cryptographic session key associated with said communication session; and
using, by the trusted execution environment circuitry, said session key to decrypt content of encrypted messages transmitted between the first computing device and the second computing device via the apparatus, and to analyse said decrypted content.

Further examples provide a first computing device comprising:
interface circuitry to communicate with a middlebox device;
session key determination circuitry to determine a cryptographic session key associated with a communication session between the first computing device and a second computing device, the communication session being conducted via the middlebox device; and
trusted execution environment circuitry to execute computer instructions to:
analyse plaintext content of encrypted messages to be transmitted to the second computing device via the middlebox device;
determine metadata for each encrypted message to be transmitted, the metadata for each message being indicative of an outcome of the analysing the plaintext content of that message; and
for each encrypted message to be transmitted, provide the metadata for that message to the interface circuitry for transmission, with that message, for the middlebox device to determine, based on the metadata, whether to block or allow transmission of that message.

Further aspects, features and advantages of the present technique will be apparent from the following description of examples, which is to be read in conjunction with the accompanying drawings.

DESCRIPTION OF EXAMPLES

Figure 1A:
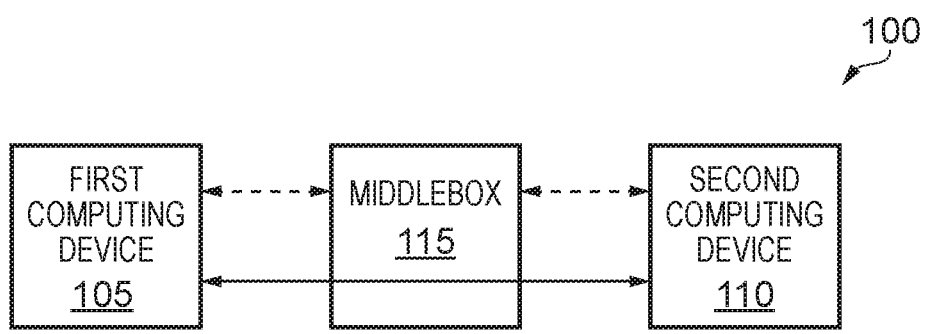
FIGS. 1A and 1B schematically shows a system 100 according to a comparative example.

In an aspect of the present disclosure, an apparatus acts as a middlebox with respect to communications between a first computing device and a second computing device. At least some communication between the devices thus takes place via the apparatus.

The apparatus comprises first interface circuitry to communicate with the first computing device, and second interface circuitry to communicate with the second computing device.

The first interface circuitry is configured to receive a handshake message from the first computing device. The second interface circuitry is configured to transmit the handshake message to the second computing device and to receive a handshake response message from the second computing device. The first interface circuitry is configured to then transmit the handshake response message to the first computing device, whereby to establish a communication session between the first computing device and the second computing device. The first and second computing devices can thus perform a handshake procedure, via the apparatus, to establish a communication session. This handshake procedure may for example proceed along the lines of a Transport Layer Security (TLS) handshake or a Secure Sockets Layer (SSL) handshake. Following the handshake, the first and second computing devices have sufficient information to each determine a cryptographic session key associated with the communication session, with which to encrypt messages for transmission. Typically, the procedure leads both the first and second devices to determine the same cryptographic session key.

The apparatus further comprises trusted execution environment (TEE) circuitry. This may for example be implemented along the lines of Intel SGX, RISC-V Keystone and Sanctum, or Arm Trustzone. The functioning of the TEE circuitry, and computer program instructions and data loaded inside, can be trusted by the endpoint devices, even if the apparatus as a whole cannot be trusted. The functioning can be partially isolated from the functioning of other functional units of the apparatus. The trust in the TEE circuitry can for example be provided by way of an attestation protocol, as described in more detail below.

The TEE circuitry executes computer instructions to determine a cryptographic session key associated with the aforementioned communication session, and to use the session key to decrypt content of encrypted messages transmitted between the first computing device and the second computing device via the apparatus, and to analyse said decrypted content. The encrypted messages can thus be read, and actions taken based on the content thereof, within the apparatus. This can be performed without compromising the privacy of the communication channel, because the first and second computing devices can trust the functioning of the TEE circuitry and the computer program instructions that it executes. For example, in an example in which the apparatus functions as a firewall, the first and second computing devices can be assured that the TEE circuitry will apply suitable rules to allow or block messages as appropriate, but will not (for example) transmit plaintext message content outside of the TEE.

The apparatus therefore provides for analysis of message content for an encrypted communication channel, without compromising privacy of communication between the endpoints (i.e. the first and second computing devices).

In an example, the first interface circuitry is configured to provide the handshake message unmodified to the second interface circuitry, and the second interface circuitry is configured to provide the handshake response message unmodified to the first interface circuitry. In other words, the handshake messages can pass straight through the apparatus without modification. For example, the apparatus (or the TEE circuitry thereof) may identify the handshake messages as being handshake messages, and not subject them to further analysis (which could for example lead to the handshake messages being blocked). This may be based on an assumption that handshake messages follow a specific format, and thus it can be assumed that they do not carry malicious content.

The TEE circuitry may be configured to determine the session key by receiving, from one of the first computing device and the second computing device, a message comprising said session key, said session key having been generated by said one of the first computing device and the second computing device responsive to at least one of said handshake message and said handshake response message. In other words, after the first and second computing devices have generated the session key, one of them can transmit the session key to the TEE circuitry.

Alternatively, the TEE circuitry may be configured to receive, from the first computing device, a cryptographic private key associated with the first computing device, and to use said private key to determine content of the handshake response message. The TEE circuitry is configured to then determine the session key based on said content of the handshake response message. This allows the TEE circuitry to determine the session key without specifically identifying the handshake messages and allowing them to be forwarded prior to determining the session key. However, this does rely on the first computing device transmitting its private key to another entity, which may not be permitted in some security protocols.

In an example, the TEE circuitry is configured to, based on said analysing of the decrypted content of a given encrypted message directed to a recipient device, said recipient device being one of the first computing device and the second computing device, determine whether to block or allow transmission of said given encrypted message to the recipient device. The TEE circuitry can thus implement firewall functionality, allowing or blocking transmission of messages. The TEE circuitry can be configured, responsive to a determination to allow transmission of said given encrypted message, to transmit said given encrypted message to the recipient device via the corresponding one of the first interface and the second interface. The TEE circuitry may be configured to receive blocking policy information from a computing device external to the trusted execution environment, and to determine whether to block or allow transmission of said given encrypted message to the recipient device based on said blocking policy information. The blocking policy information may indicate whether to block or allow transmission of said given encrypted message based on the decrypted content of said given encrypted message. The firewall logic applied by the TEE circuitry can thus be updated, with the first and second computing devices remaining assured that even if the blocking policy information changes, the TEE circuitry can still be trusted (and will not, for example, transmit plaintext message content outside the TEE circuitry).

In an example, the TEE circuitry is configured to perform an attestation process in respect of at least one of computer instructions to be executed by the trusted execution environment circuitry; and initial data, associated with the trusted execution environment circuitry, in respect of which the trusted execution environment circuitry is to perform said computer instructions. As mentioned above, this attestation process provides a way for the first and second computing devices to trust that the TEE circuitry is functioning as expected, even if the apparatus as a whole is not trusted.

The attestation process may comprise receiving, from one of the first computing device and the second computing device, an attestation request message. Responsive to said attestation request message, the attestation process may comprise transmitting to said one of the first computing device and the second computing device an attestation token for verification. For example, the attestation token may be provided to an attestation service to be verified by the attestation service, after which an attestation confirmation can be provided from the attestation service to said one of the first and second computing devices. This provides an effective way of performing the attestation process by way of a trusted third party attestation service, which may for example be provided by the manufacturer of the TEE circuitry. Alternatively, the attestation token may be verified by said one of the first and second computing devices. In some examples, the attestation token comprises a cryptographic hash of the aforementioned computer instructions and/or a cryptographic hash of the aforementioned initial data. This provides a mechanism for providing trust that the instructions and/or initial data are as expected, and have not been modified.

In an example, the TEE circuitry is configured to disallow unencrypted transmission of said decrypted content of said encrypted messages outside of the TEE circuitry. Alternatively or additionally, the TEE circuitry may be configured to disallow transmission of said session key outside of the TEE circuitry. This allows the security of the encrypted communication channel between the first and second computing devices to be maintained, as no untrusted entity has access to decrypted message content or to the session key. Similarly, the TEE circuitry may be configured to protect said computing instructions executed by the TEE circuitry from modification by untrusted computing instructions executed by the apparatus. These aspects of functionality may be defined within the computer program instructions to be executed by the TEE circuitry, and thus can be assured by way of the aforementioned attestation protocol.

Aspects of the present disclosure provide a method, which may for example be carried out by a system including a middlebox device such as the above-mentioned apparatus, and first and second computing devices. The method comprises:

transmitting a handshake message from the first computing device to the middlebox device;

transmitting the handshake message from the middlebox device to the second computing device;

responsive to receiving the handshake message at the second computing device, transmitting a handshake response message from the second computing device to the first computing device, via the middlebox device, whereby to establish a communication session between the first computing device and the second computing device;

determining, by TEE circuitry of the middlebox device, a cryptographic session key associated with said communication session; and using, by the TEE circuitry, said session key to decrypt content of encrypted messages transmitted between the first computing device and the second computing device via the apparatus, and to analyse said decrypted content.

In examples, the method comprises performing an attestation process in respect of computer instructions to be executed by the TEE circuitry, said computer instructions defining said determining the cryptographic session key and said using the session key.

The attestation process may be based on the attestation protocol discussed above. For example, the attestation process may comprise transmitting an attestation request message from one of the first computing device and the second computing device to the TEE circuitry followed by, responsive to said attestation request message, transmitting an attestation token from the TEE circuitry to said one of the first computing device and the second computing device. The attestation token can then be certified as genuine by the first computing device, for example by way of an attestation service as discussed above.

In examples, the method further comprises:

responsive to receiving the handshake message at the middlebox device, transmitting the handshake message with a first attestation token to a second middlebox device, the first attestation token being in respect of the trusted execution environment circuitry of the middlebox device;

responsive to receiving the handshake message at the second middlebox device, transmitting the handshake message with the first attestation token and a second attestation token to the second computing device, the second attestation token being in respect of the trusted execution environment circuitry of the second middlebox device;

by the second computing device, verifying the first and second attestation tokens and, based on the verifying, generating first attestation group key agreement information for a group key agreement; and transmitting the handshake response message from the second computing device to the first computing device, via the second middlebox device and the middlebox device, with the first attestation group key agreement information.

transmitting the handshake response message from the second computing device to the second middlebox device, with the first attestation group key agreement information;

by the second middlebox device, generating second attestation group key agreement information for the group key agreement and transmitting the handshake response message to the middlebox device with the second attestation group key agreement information;

by the middlebox device, generating third attestation group key agreement information for the group key agreement and transmitting the handshake response message to the first computing device with the third attestation group key agreement information;

by the first computing device, verifying the third attestation group key information to complete the group key agreement.

This allows the attestation to be performed as part of the handshake process, in a system with multiple middleboxes, with all parties being fully aware of all participants.

In such examples, the method may comprise completing a second key agreement between the first computing device and the second computing device and, by the first computing device and the second computing device, using a shared secret associated with the second key agreement to perform an integrity assurance in respect of messages transmitted between the first computing device and the second computing device. This allows the first and second computing devices (i.e. the endpoints) to provide assurance of the integrity of messages that they send. This also allows assurance that only the first and second computing devices (i.e. the endpoints) can properly authenticate the integrity of messages, so that the message source can be trusted.

In a further aspect of the present disclosure, there is provided a first computing device comprising:

interface circuitry to communicate with a middlebox device;

session key determination circuitry to determine a cryptographic session key associated with a communication session between the first computing device and a second computing device, the communication session being conducted via the middlebox device; and trusted execution environment circuitry to execute computer instructions to:

analyse plaintext content of encrypted messages to be transmitted to the second computing device via the middlebox device;

determine metadata for each encrypted message to be transmitted, the metadata for each message being indicative of an outcome of the analysing the plaintext content of that message; and for each encrypted message to be transmitted, provide the metadata for that message to the interface circuitry for transmission, with that message, for the middlebox device to determine, based on the metadata, whether to block or allow transmission of that message.

In this manner, the TEE functionality can be implemented in one of the endpoints. This may be practically less complex to implement, in particular in systems where the middlebox is provided by a third party, whilst still providing the middlebox with sufficient information to determine whether to allow or block a given message. The above-described configuration can be mirrored for the second computing device, so that both computing devices implement TEE functionality and can determine suitable metadata for messages that they transmit.

Examples of the present disclosure will now be described with reference to the drawings.

FIG. 1A schematically shows a system 100 according to a comparative example which does not implement examples of the present disclosure. The system 100 includes a first computing device 105 and a second computing device 110, which communicate via a middlebox 115.

In one communication mode, the first computing device 105 and second computing device 110 communicate on an unencrypted communication channel (shown with dashed arrows). The middlebox device 115 is able to read messages transmitted between the computing devices 105, 110 and can apply filtering logic to determine, based on the message content, which messages should be forwarded to the recipient and which should be blocked. However, because the channel is unencrypted, data transmitted thereon is not secure.

In another communication mode, the first computing device 105 and second computing device 110 communicate on an end-to-end encrypted communication channel (shown with a solid arrow). Data transmitted thereon is therefore secure. However, the middlebox 115 is unable to read messages between the computing devices 105, 110 and therefore cannot apply any filtering logic based on the message content. The ability of the middlebox to effectively filter traffic is thus limited. Whilst the middlebox 115 could, for example, block all traffic to one of the computing devices 105, 110, it cannot apply more sophisticated message-content-specific filtering policies.

Figure 1B:
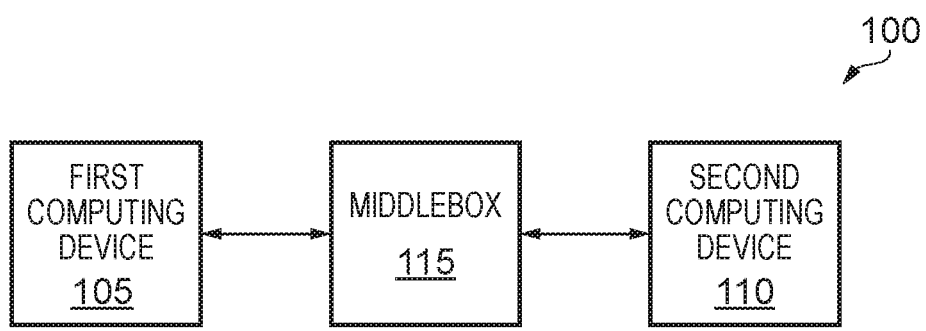

FIG. 1B schematically shows a way in which the system 100 can provide for message-content-specific filtering of encrypted traffic. This is performed by way of a communication mode in which each of the first and second computing devices 105, 110 establish an encrypted communication channel which terminates at the middlebox 115 (shown with solid arrows). Whilst this allows encrypted communication and also allows the middlebox 115 to perform message-content-specific filtering, this breaks the end-to-end nature of the encrypted communication channel (which in effect becomes two separate encrypted channels) and requires the first and second computing devices 105, 110 to trust the middlebox 115, which may not be desirable for example if the middlebox is provided by an untrusted third party. For example, if the middlebox 115 is compromised by an attacker, confidentiality and integrity of the communication channel is lost without being detected by the first and second computing devices 105, 110.

Figure 2:
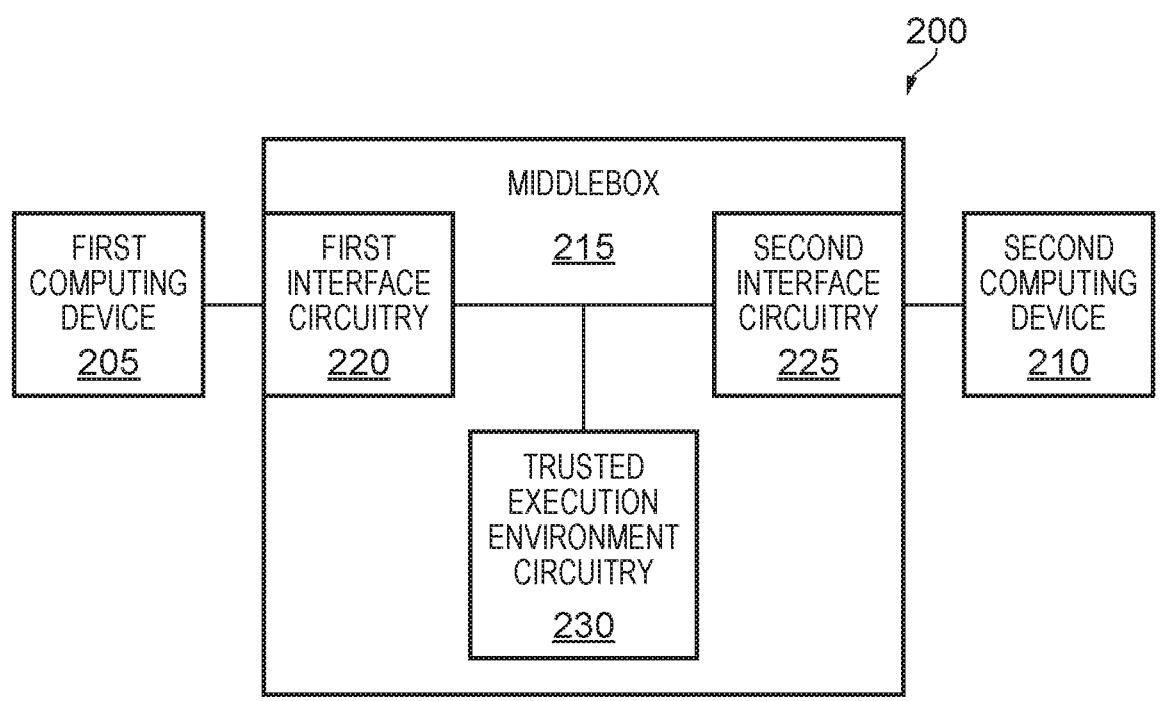
FIG. 2 schematically shows a system according to an aspect of the present disclosure.

FIG. 2 schematically shows a system 200 according to an aspect of the present disclosure. The system 200 comprises a first computing device 205 and a second computing device 210, which communicate via a middlebox device 215. The middlebox 215 comprises first interface circuitry 220 to communicate with the first computing device 205, and second interface circuitry 225 to communicate with the second computing device 210. The middlebox 215 is not in general trusted by the first and second computing devices 205, 210.

The middlebox 215 also comprises trusted execution environment (TEE) circuitry 230. The functionality of the TEE circuitry 230 is trusted by the first and second computing devices 205, 210, even though the middlebox 215 as a whole is not trusted. This trust may for example be provided by way of an attestation process, as described elsewhere in the present disclosure.

The first and second computing devices 205, 210 communicate by way of an end-to-end encrypted communication channel, with an associated session key which is used to encrypt and decrypt messages transmitted on the channel. The TEE 230 acquires this session key, for example as part of a handshake process as described in more detail below with reference to FIGS. 3A and 3B. The TEE 230 can use this session key to decrypt messages transmitted between the first and second computing devices 220, 225, and thereby obtain decrypted (plaintext) message content. Based on this content, the TEE 230 can apply a filtering policy to determine whether a given message should be transmitted from the middlebox 215 to the recipient, or whether it should be blocked. Message-content-specific filtering can thus be applied within an end-to-end encrypted communication channel, without any untrusted entity having access to plaintext message content. Example filtering policies include filters based on message blacklists, forbidden message formats and prevention of leaking of classified content.

Methods for providing the TEE circuitry 230 with the session key will now be described with reference to FIGS. 3A and 3B. For simplicity, these figures show only the first computing device 205, second computing device 210, and TEE 230: the interface circuitry 220, 225 of the middlebox 215 is not shown.

Figure 3A:
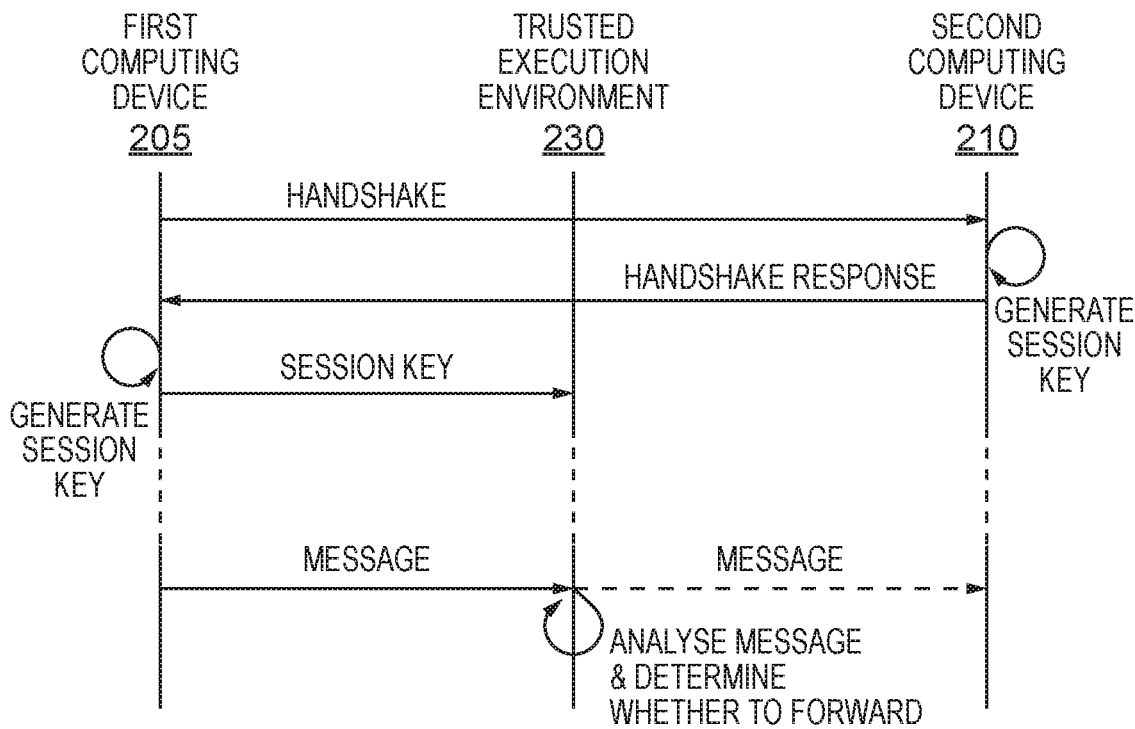
FIGS. 3A and 3B depict methods which can be implemented within the system of FIG. 2.

In FIG. 3A, the first computing device 205 transmits a handshake message to the second computing device 210. This message is transmitted through the middlebox 215 without modification and without filtering. The purpose of the handshake message is to begin establishment of an end-to-end encrypted communication channel. The second computing device generates a session key for the channel, based on content of the handshake message (for example a series of random bytes generated by the first computing device).

The second computing device 210 transmits a handshake response message to the first computing device 205. This message is transmitted through the middlebox 215 without modification and without filtering.

The first computing device 205 generates the session key for the channel based on the content of the handshake response message (for example a series of random bytes generated by the second computing device 210 and used by the second computing device 210 to determine the session key). Both computing devices 205, 210 use the same algorithm and the same input data (for example the aforementioned random bytes) to determine the session key, so that they both arrive at the same session key. This session key can then be used to encrypt and decrypt messages for transmission between the computing devices 205, 210, and thus the communication channel can be considered established.

The first computing device 205 provides the session key, through a secure channel, to the TEE 230. Alternatively, the second computing device 205 may provide the session key to the TEE 230. Once it has received the session key, the TEE is able to decrypt encrypted messages transmitted between the first and second computing devices 205, 210.

At a later time, the first computing device 205 transmits a message, via the middlebox 215, to the second computing device 210. The TEE 230 uses the session key to decrypt the message and analyse its plaintext content. Based on this, the TEE 230 determines whether or not the message should be forwarded to the second computing device 210. The message is then forwarded if appropriate. The decryption and analysis is performed entirely within the TEE 230, so that untrusted components of the middlebox 230 do not have access to any plaintext message content.

Figure 3B:
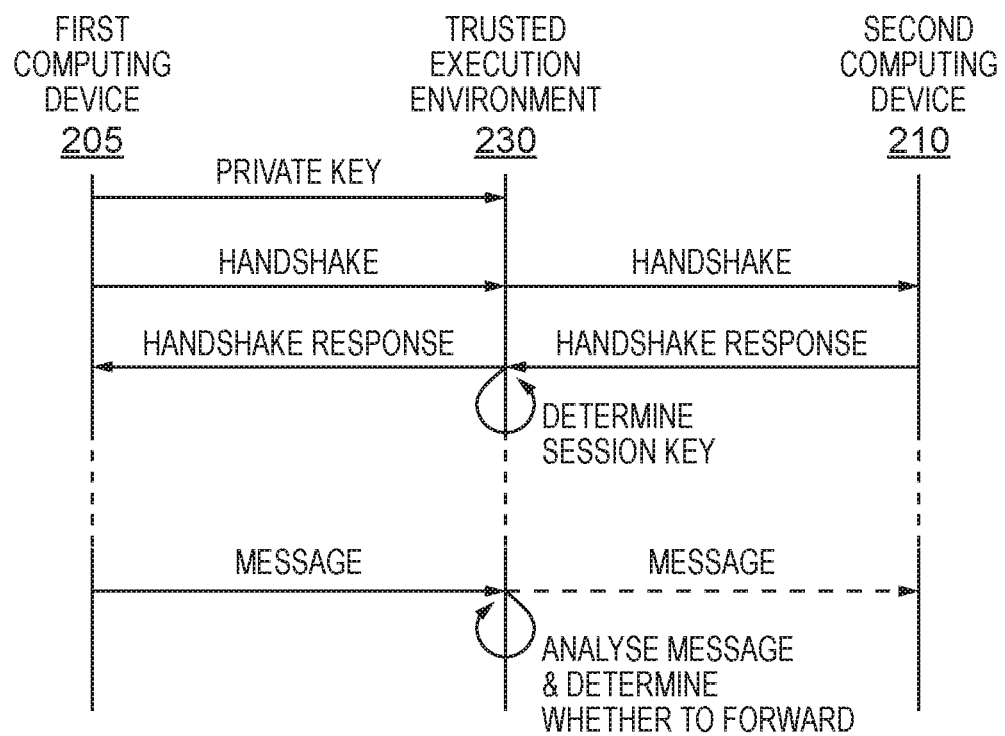

In FIG. 3B, the first computing device 205 transmits its private encryption key, which will be used for establishing communication with the second computing device 210, to the TEE 230.

The first computing device 205 then transmits the handshake message to the second computing device 210. The second computing device responds with a handshake response message. The handshake message and handshake response message are similar to those discussed above with reference to FIG. 3A. Because the TEE 230 has the private key of the first computing device 205, it can extract the content of the handshake and handshake response messages, and thereby determine the session key (using the same algorithm that is used by the first and second computing devices 205, 210 to determine the session key).

At a later time, the TEE 230 can analyse messages transmitted between the first and second computing devices 205, 210 and determine whether or not they should be forwarded, as described above with reference to FIG. 3A.

The method of FIG. 3B therefore does not rely on the TEE 230 being able to identify the handshake and handshake response messages and forward them without extracting their content, as is the case for FIG. 3A. The method of FIG. 3B also, as a consequence of allowing key-sharing (and attestation) prior to establishment of a communication session, can be implemented without modification of endpoint applications. However, the method of FIG. 3B does include a transmission of the private key of the first computing device 205 to the TEE 230 (i.e. a transmission to a different entity), which may violate some security protocols. As a partial mitigation of this, the private key provided by the first computing device 205 could be a temporary key derived from an initial private key which is not transmitted outside the first computing device 205.

Figure 4:
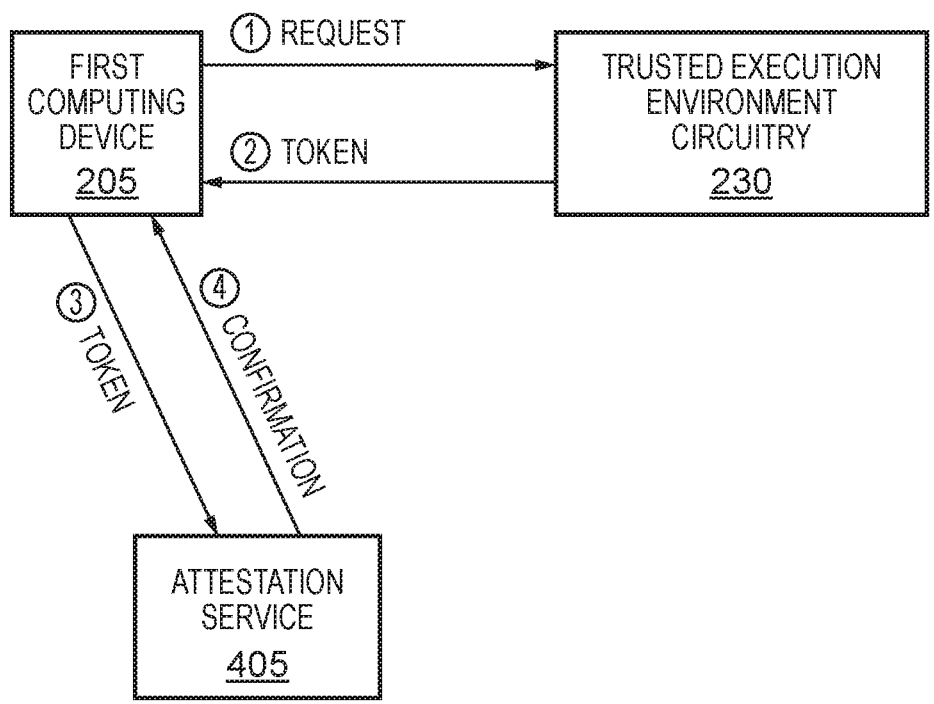
FIG. 4 schematically illustrates an attestation process according to an example of the present disclosure.

FIG. 4 schematically illustrates an attestation process according to an example of the present disclosure. The attestation process allows a computing device communicating with a TEE to have confidence that the TEE is functioning as expected, and has not had its behaviour modified (for example maliciously). The process is performed within a system comprising a first computing device 205 and TEE circuitry 230 (within a middlebox which is not shown in FIG. 4), as described above. The system also comprises an attestation service 405. This may for example be a third-party attestation service which is trusted by the first computing device 205. For example, it may be provided by a trusted manufacturer of the TEE circuitry 230, or another trusted authority.

As a first step, the first computing device 205 transmits an attestation request to the TEE circuitry 230. This may be performed as part of a handshake procedure, such as one of the handshake procedures described above.

In response to the attestation request, the TEE circuitry 230 transmits an attestation token to the first computing device 205. The attestation token includes data identifying the TEE, and a cryptographic hash of the computer program instructions to be executed by the TEE and any initial data to be provided as inputs to the computer program instructions.

The first computing device 205 transmits the attestation token to the attestation service 405. The attestation service 405 verifies the attestation token, to confirm that the computer program instructions and initial data to be executed by the TEE 230 are as expected, and have not been modified. The attestation service 405 transmits a confirmation of this verification to the first computing device 205. The first computing device 205 can thereby trust the TEE 230, and trust that it will behave as expected.

In other examples, attestation may be performed using a different process. For example, in some implementations, no attestation service is used and the first computing device 205 verifies the attestation token itself.

Figure 5:
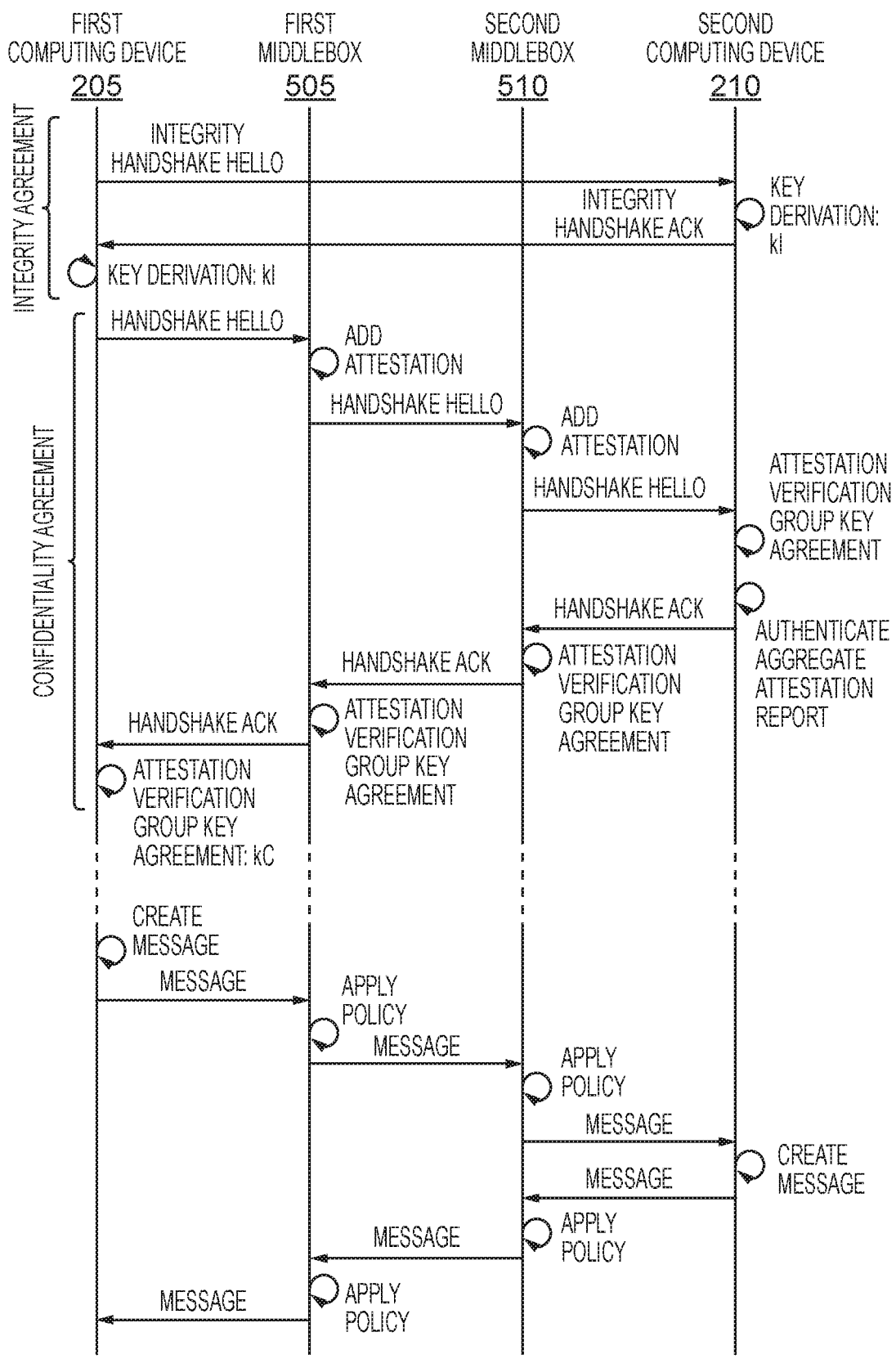
FIG. 5 schematically shows a process by which attestation can be performed as part of a handshake process.

FIG. 5 schematically shows a process by which attestation can be performed as part of a handshake process, in a system comprising a first computing device 205 and a second computing device 210 as described above, which communicate via a first middlebox 505 comprising a TEE and a second middlebox 510 comprising a TEE. For brevity, the TEE of each middlebox is not shown, but it will be appreciated that the below-described attestation and filtering policy functions will be performed by the TEE of the corresponding middlebox.

The process begins with an integrity agreement, for which the first computing device 205 sends an integrity handshake hello message to the second computing device 210, and the second computing device 210 responds with an integrity handshake acknowledgement message. This may for example proceed along the lines of a Diffie-Hellman key exchange. Based on this, the first and second computing devices 205, 210 derive a shared integrity key kI.

The process then proceeds with the establishment of a confidentiality agreement.

The first computing device 205 derives a cryptographic nonce from kI and transmits a handshake hello message, including the nonce, via the first middlebox 505 and second middlebox 510 to the second computing device 210. Each middlebox 505, 510 treats the handshake hello message as an attestation challenge and adds an attestation report to the handshake hello message, using the handshake nonce, before forwarding the handshake hello message to the next participant.

The second computing device 210 verifies the attestation reports and performs a group key agreement to derive a group shared secret. In some examples, the second computing device 210 adds authentication information to the group of attestation reports, such as a cryptographic signature or message authentication code.

The second computing device 210 then responds to the handshake hello message with a handshake acknowledgement message, which may for example be similar to the handshake response message discussed above with reference to FIGS. 3A and 3B. The second computing device 210 appends the attestation reports to the handshake acknowledgement message.

The handshake acknowledgement message is transmitted to the first computing device, via the second middlebox 510 and first middlebox 505. Each middlebox 510, 505 may optionally verify the attestation reports, apply any relevant participation policy (defining which entities are allowed to take part in a communication session), and perform the group key agreement to derive the shared group secret.

The first computing device 210 receives the handshake acknowledgement message and verifies the attestation reports. It then performs the group key agreement to derive the shared group secret. The first computing device 210 can then determine whether or not to proceed with the connection, based on the participants.

If it determines to proceed with the connection, the first computing device 210 derives a shared cryptographic key, kC, based on the shared secret. At this point, an encrypted communication channel between the first computing device 205 and the second computing device 210 can be considered open, with the functionality of the TEE of each middlebox device having been attested and verified.

At a later time, the first computing device 205 creates a message to be transmitted to the second computing device 210. This message is encapsulated in an authentication wrapper based on kI, and encrypted using kC.

The first computing device 205 transmits the message to the second computing device 210 via the middleboxes 505, 510. Each middlebox decrypts the message using kC, and applies filtering policies to determine whether to forward the message or block its transmission.

Similarly, the same process applies in reverse when the second computing device creates a message for transmission to the first computing device 205.

This process, with the combination of kI and kC, allows various beneficial properties. In particular, only the first and second computing devices 205, 210 can properly authenticate messages with kI. The middleboxes 505, 510 can read messages and decide whether to forward or block them, but cannot tamper with the messages. All parties are also made aware of all participants in the communication.

Figure 6:
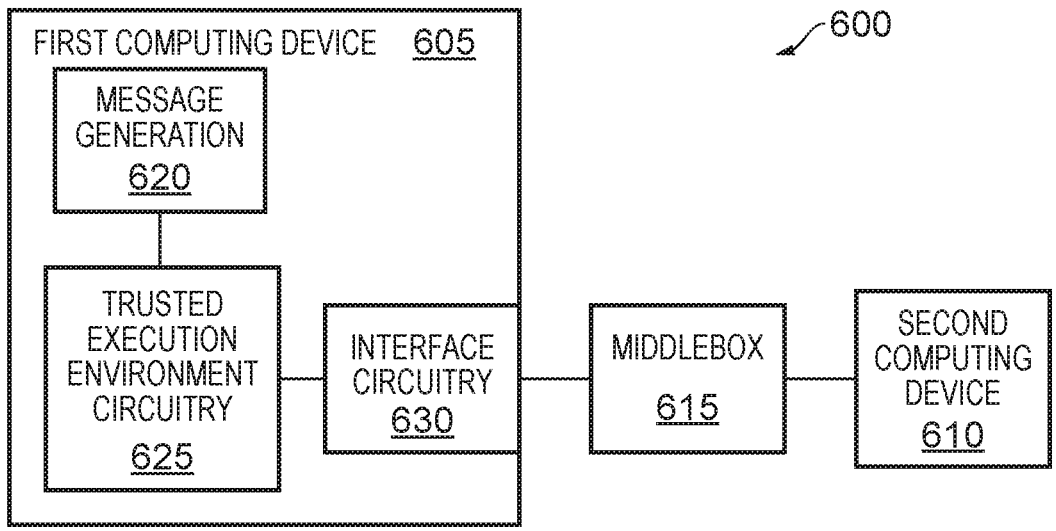
FIG. 6 schematically illustrates a system according to an aspect of the present disclosure.

FIG. 6 schematically illustrates a system 600 according to an aspect of the present disclosure. The system 600 comprises a first computing device 605 which communicates with a second computing device 610 via a middlebox 615.

The first computing device 605 comprises message generation circuitry 620 to generate messages for transmission to the second computing device 610. The first computing device 605 also comprises TEE circuitry 625 and interface circuitry 630 for communicating with the middlebox 615. The middlebox 615 in this example does not include TEE circuitry: in contrast with the previously-described examples, in the system 600 the TEE functionality is implemented by the first computing device 605. The second computing device 610 may also implement TEE functionality, but for conciseness this is not shown in FIG. 6.

Figure 7:
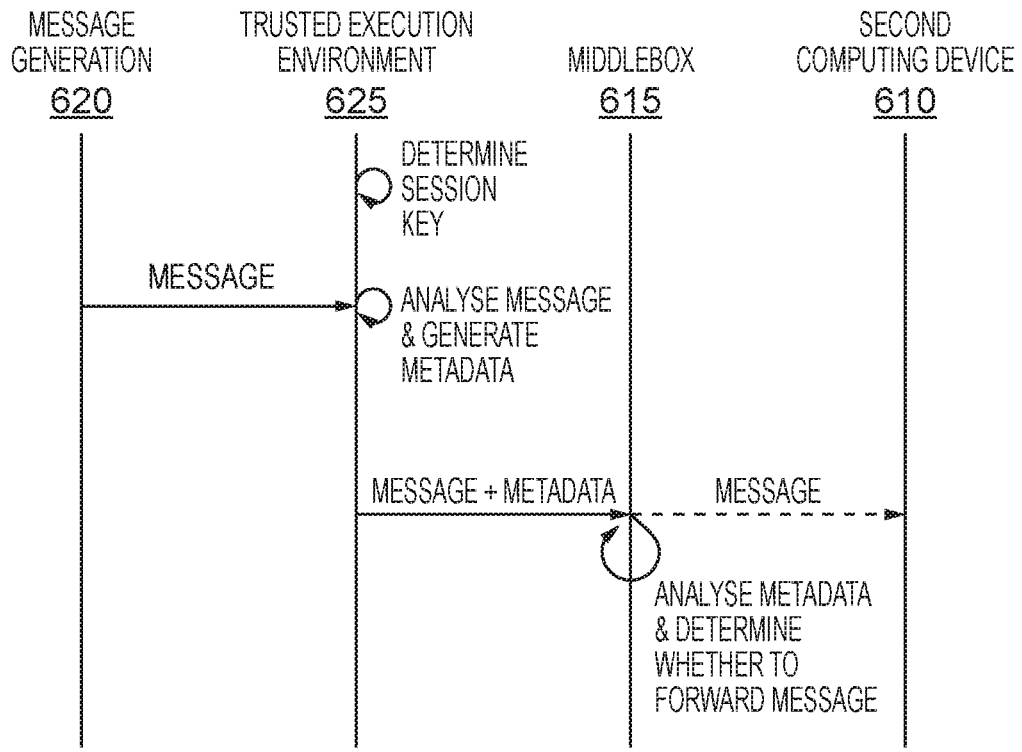
FIG. 7 illustrates a method which can be implemented within the system of FIG. 6.

FIG. 7 illustrates a method which can be implemented within the system 600 of FIG. 6. For conciseness, the interface circuitry 630 of the first computing device 605 is not shown.

Prior to the steps shown in FIG. 7, an encrypted communication channel with an associated session key is established between the first computing device 605 and the second computing device 610.

The TEE circuitry 625 of the first computing device 605 determines the session key of the encrypted communication channel. For example, this may be provided by another component of the first computing device 605.

The message generation circuitry 620 generates an encrypted message for transmission to the second computing device 610, and provides the message to the TEE circuitry 625. The TEE circuitry 625 decrypts the message using the session key and analyses the metadata with reference to a filtering policy (such as the filtering policies discussed elsewhere herein). The TEE circuitry 625 generates metadata associated with the outcome of the analysis, for example indicating whether the message satisfies the filtering policy. The message is then transmitted, with the metadata, to the middlebox 615. The metadata is encrypted or signed with a key known to the middlebox 615.

The middlebox 615 analyses the metadata and determines, based on the metadata, whether the message should be forwarded to the second computing device 610. Based on this determination, the middlebox 615 then either drops the message or forwards it to the second computing device 610.

The above-described functionality can be mirrored for messages from the second computing device 610 to the first computing device 605, by way of TEE circuitry in the second computing device 610 (not shown in FIG. 6).

In this method, the traffic is not decrypted outside of the endpoint devices (i.e. the first and second computing devices 605, 610, and there is no mechanism for the endpoint to circumvent the middlebox's network function since failure to decrypt or validate the signature would mean that the message had been altered between the endpoint TEE 625 and the middlebox 615.

The TEE functionality is thereby "offloaded" from the middlebox to the endpoint device(s). This reduces computational overhead (in terms of computation time devoted to cryptography) in the middlebox. Furthermore, this allows the message generation circuitry 620 (or another component of the first computing device 605) to attest only the locally-running TEE 625 before providing it with the session key.

Figure 8:
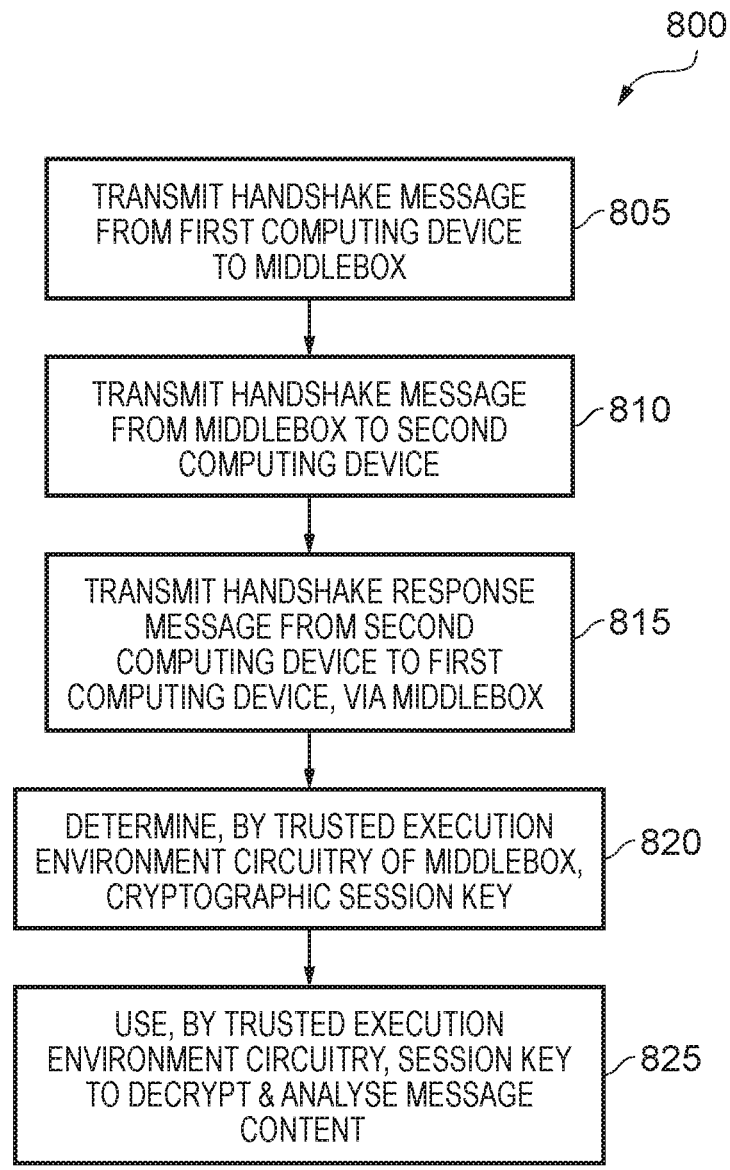
FIG. 8 schematically depicts a method according to an aspect of the present disclosure.

FIG. 8 schematically depicts a method 800 according to an aspect of the present disclosure. The method 800 can be implemented in a system such as the system 200 of FIG. 2.

At block 805, a handshake message is transmitted from a first computing device to a middlebox device.

At block 810, the handshake message is transmitted from the middlebox device to a second computing device.

At block 815, a handshake response message is transmitted from the second computing device to the first computing device, via the middlebox. This establishes a communication session between the first computing device and the second computing device.

At block 820, TEE circuitry of the middlebox device determines a cryptographic session key associated with the communication session.

At block 825, the TEE circuitry uses the session key to decrypt encrypted messages transmitted between the first computing device and the second computing device, and analyses the decrypted content.

Apparatuses and methods are thus provided for allowing message-content-specific filtering in an encrypted communication channel, without compromising the security of that channel.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although elements are described above as "circuitry", the skilled person would understand that these elements could be implemented as dedicated circuitry, or as functional aspects of more general-purpose circuitry such as a central processing unit. These elements could also for example be implemented by semi-dedicated circuitry such as field-programmable gate arrays or application-specific integrated circuits.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
   first interface circuitry to communicate with a first computing device;
   second interface circuitry to communicate with a second computing device, wherein:
      the first interface circuitry is configured to receive a handshake message from the first computing device;
      the second interface circuitry is configured to transmit the handshake message to the second computing device and to receive a handshake response message from the second computing device; and
      the first interface circuitry is configured to transmit the handshake response message to the first computing device, whereby to establish a communication session between the first computing device and the second computing device, and
   trusted execution environment circuitry to execute computer instructions to:
      determine a cryptographic session key associated with said communication session;
      use said session key to decrypt content of encrypted messages transmitted between the first computing device and the second computing device via the apparatus, and to analyse said decrypted content;
      perform an attestation process in respect of computer instructions to be executed by the trusted execution environment circuitry, said computer instructions defining said determining the cryptographic session key and said using the session key;
   the apparatus being further configured to, for the attestation process:
      responsive to receiving the handshake message at the first interface circuitry, transmit the handshake message with a first attestation token, via the second interface circuitry, to a second apparatus, the first attestation token being in respect of the trusted execution environment circuitry whereby for the second apparatus to transmit the handshake message with the first attestation token and a second attestation token to the second computing device, the second attestation token being in respect of the trusted execution environment circuitry of the second apparatus;
      receive, at the second interface, second attestation group key agreement information for a group key agreement generated by the second apparatus in response to first attestation group key agreement information generated by the second computing device in response to verifying the first and second attestation tokens;
      generate third attestation group key agreement information for the group key agreement and transmitting the handshake response message to the first computing device with the third attestation group key agreement information, for verification by the first computing device to complete the group key agreement.

2. An apparatus according to claim 1, wherein:
   the first interface circuitry is configured to provide the handshake message unmodified to the second interface circuitry; and
   the second interface circuitry is configured to provide the handshake response message unmodified to the first interface circuitry.

3. An apparatus according to claim 1, wherein:
   the trusted execution environment circuitry is configured to determine the session key by receiving, from one of the first computing device and the second computing device, a message comprising said session key, said session key having been generated by said one of the first computing device and the second computing device responsive to at least one of said handshake message and said handshake response message.

4. An apparatus according to claim 1, wherein the trusted execution environment circuitry is configured to, based on said analysing of the decrypted content of a given encrypted message directed to a recipient device, said recipient device being one of the first computing device and the second computing device, determine whether to block or allow transmission of said given encrypted message to the recipient device.

5. An apparatus according to claim 4, wherein the trusted execution environment circuitry is configured to:
   receive blocking policy information from a computing device external to the trusted execution environment; and
   determine whether to block or allow transmission of said given encrypted message to the recipient device based on said blocking policy information.

6. An apparatus according to claim 5, wherein the blocking policy information indicates whether to block or allow transmission of said given encrypted message based on the decrypted content of said given encrypted message.

7. An apparatus according to claim 4, wherein the trusted execution environment circuitry is configured, responsive to a determination to allow transmission of said given encrypted message, to transmit said given encrypted message to the recipient device via the corresponding one of the first interface and the second interface.

8. An apparatus according to claim 1, wherein the trusted execution environment circuitry is configured to perform an attestation process in respect of at least one of:
   said computer instructions to be executed by the trusted execution environment circuitry; and initial data, associated with the trusted execution environment circuitry, in respect of which the trusted execution environment circuitry is to perform said computer instructions.

9. An apparatus according to claim 8, wherein the attestation process comprises:
receiving, from one of the first computing device and the second computing device, an attestation request message; and
responsive to said attestation request message, transmitting to said one of the first computing device and the second computing device an attestation token for verification.

10. An apparatus according to claim 9, wherein the attestation token comprises at least one of:
a cryptographic hash of said computer instructions; and
a cryptographic hash of said initial data.

11. An apparatus according to claim 1, wherein the trusted execution environment circuitry is configured to disallow unencrypted transmission of said decrypted content of said encrypted messages outside of the trusted execution environment circuitry.

12. An apparatus according to claim 1, wherein the trusted execution environment circuitry is configured to disallow transmission of said session key outside of the trusted execution environment circuitry.

13. An apparatus according to claim 1, wherein the trusted execution environment circuitry is configured to protect said computing instructions executed by the trusted execution environment circuitry from modification by untrusted computing instructions executed by the apparatus.

14. An apparatus according to claim 1, wherein the trusted execution environment circuitry is configured to:
receive, from the first computing device, a cryptographic private key associated with the first computing device;
use said private key to determine content of the handshake response message; and
determine the session key based on said content of the handshake response message.

15. A method comprising:
transmitting a handshake message from a first computing device to a middlebox device;
transmitting the handshake message from the middlebox device to a second computing device;
responsive to receiving the handshake message at the second computing device, transmitting a handshake response message from the second computing device to the first computing device, via the middlebox device, whereby to establish a communication session between the first computing device and the second computing device;
determining, by trusted execution environment circuitry of the middlebox device, a cryptographic session key associated with said communication session;
using, by the trusted execution environment circuitry, said session key to decrypt content of encrypted messages transmitted between the first computing device and the second computing device via the apparatus, and to analyse said decrypted content;
performing an attestation process in respect of computer instructions to be executed by the trusted execution environment circuitry, said computer instructions defining said determining the cryptographic session key and said using the session key;
responsive to receiving the handshake message at the middlebox device, transmitting the handshake message with a first attestation token to a second middlebox device, the first attestation token being in respect of the trusted execution environment circuitry of the middlebox device;
responsive to receiving the handshake message at the second middlebox device, transmitting the handshake message with the first attestation token and a second attestation token to the second computing device, the second attestation token being in respect of the trusted execution environment circuitry of the second middlebox device;
by the second computing device, verifying the first and second attestation tokens and, based on the verifying, generating first attestation group key agreement information for a group key agreement;
transmitting the handshake response message from the second computing device to the first computing device, via the second middlebox device and the middlebox device, with the first attestation group key agreement information;
transmitting the handshake response message from the second computing device to the second middlebox device, with the first attestation group key agreement information;
by the second middlebox device, generating second attestation group key agreement information for the group key agreement and transmitting the handshake response message to the middlebox device with the second attestation group key agreement information;
by the middlebox device, generating third attestation group key agreement information for the group key agreement and transmitting the handshake response message to the first computing device with the third attestation group key agreement information; and
by the first computing device, verifying the third attestation group key information to complete the group key agreement.

16. A method according to claim 15, wherein the attestation process comprises:
transmitting an attestation request message from one of the first computing device and the second computing device to the trusted execution environment circuitry;
responsive to said attestation request message, transmitting an attestation token from the trusted execution environment circuitry to said one of the first computing device and the second computing device;
certifying the attestation token as genuine by the first computing device.

17. A method according to claim 15, comprising:
completing a second key agreement between the first computing device and the second computing device; and
by the first computing device and the second computing device, using a shared secret associated with the second key agreement to perform an integrity assurance in respect of messages transmitted between the first computing device and the second computing device.

* * * * *